United States Patent [19]

Yovichin et al.

[11] Patent Number: 5,610,329
[45] Date of Patent: Mar. 11, 1997

[54] LOW-COST RUNOUT SENSOR WITH HIGH FREQUENCY RESPONSE AND NEGLIGIBLE STICTION IN THE DIRECTION OF TRAVEL

[75] Inventors: Albert J. Yovichin, North Canton; William F. Dunn, Stow; William R. Dutt, Akron; Richard C. Houck, Clinton; David D. Hyde, Akron; Raouf A. Ridha, Sharon Center; Harry R. Swanson, Akron, all of Ohio

[73] Assignee: The Goodyear Tire & Rubber Company, Akron, Ohio

[21] Appl. No.: 402,433

[22] Filed: Mar. 10, 1995

[51] Int. Cl.⁶ .................................................. G01M 17/02
[52] U.S. Cl. ........................ 73/146; 33/501.03; 33/203.18
[58] Field of Search ............................. 73/146, 728, 722; 33/501.02, 501.03, 501.04, 203, 203.12, 203.15, 203.18, 551, 553, 554, 555

[56] References Cited

U.S. PATENT DOCUMENTS

| | | | |
|---|---|---|---|
| 2,697,281 | 12/1954 | Watson | 33/501.02 |
| 3,118,108 | 1/1964 | Zoss et al. | 73/728 X |
| 3,525,929 | 8/1970 | Mounce | 33/501.03 X |
| 4,530,161 | 7/1985 | Blankinship | 33/178 E |
| 5,313,827 | 5/1994 | Yovichin | 73/146 |

OTHER PUBLICATIONS

Omega; The Pressure Strain and Force Handbook (product catalog); pp. Z–77 to Z–81. 1992.

*Primary Examiner*—Richard Chilcot
*Assistant Examiner*—Joseph L. Felber
*Attorney, Agent, or Firm*—David E. Wheeler

[57] ABSTRACT

An apparatus which uses a sensing device for measuring gauges of elastomeric or rigid articles, or runout of elastomeric articles, has a pivoting arm which holds a means for creating a signal, and is movable relative to the object being measured. The means for creating a signal provides a signal to the sensing device, and the magnitude of the signal depends on the position of the pivoting arm relative to the object being measured. Movement of the pivoting arm, caused by changes in the dimensions of the object, can be recorded and analyzed.

6 Claims, 4 Drawing Sheets

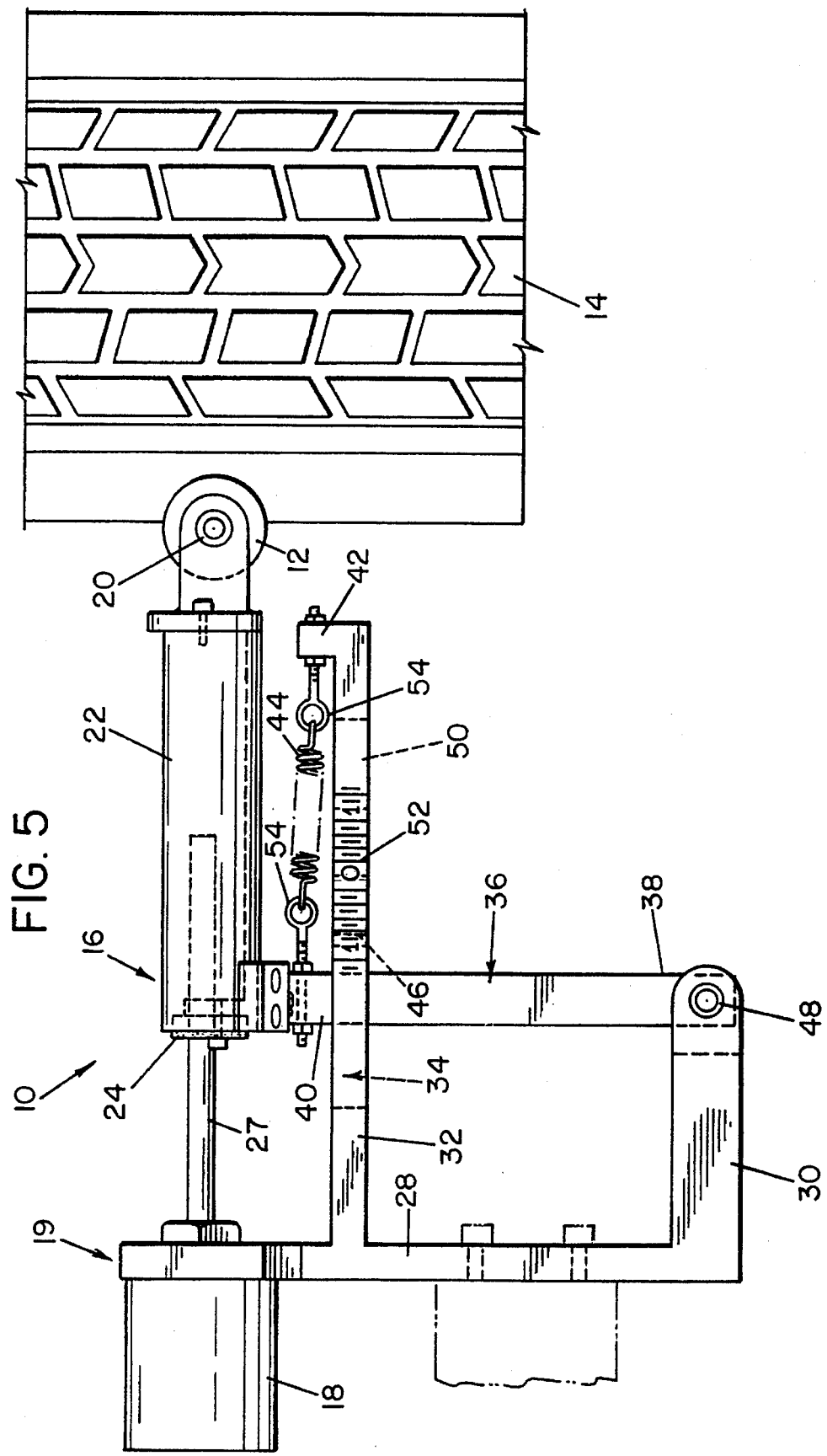

1

LOW-COST RUNOUT SENSOR WITH HIGH FREQUENCY RESPONSE AND NEGLIGIBLE STICTION IN THE DIRECTION OF TRAVEL

BACKGROUND OF THE INVENTION

The invention relates to sensors used for dynamically measuring the gauge or runout of an article.

Sensors used to measure the gauge of calendered products, or the runout on elastomeric articles, for example tires, sometimes give erroneous readings because of the dust and dirt encountered in the factory environment in which they are used. If a contact sensor is used, dust can interfere at the contact point between the sensor and article being measured, or with the moving parts of the apparatus itself, and cause drag or stiction. Dust can also interfere with the readings obtained from non-contact optical sensors by interfering with the optical read of the sensor, and some such sensors, for example lasers, respond to markings on the tire, which gives extraneous readings.

As used herein "stiction" refers to momentary resistance to movement, which can be caused by inertia, friction, momentary locking of moving parts, or by other phenomena recognized by those skilled in the art.

Linear variable differential transformer (LVDT) sensors use a ball bearing contact with the object which is measured. Dust sometimes causes stiction in such sensors, and stiction may prevent good resolution in the measurements obtained.

Rotary transformer, stylus type sensors are sometimes used to measure radial runout of tires on force variation machines. As the description indicates, such sensors are shaped like a pencil, are dragged across the surface of the object being measured, and changes in position are recorded by measuring phase angle changes which are converted to a voltage signal.

Ultrasonic sensors provide limited measurements because the spot size for such sensors is very large, and small isolated changes in dimension are not easily detected since small wavelengths must be used for good resolution, and accuracy of many transformers are reduced at small wavelengths. Similarly, capacitive sensors are useful only for large spot size measurements since the capacitive probe must be very small to get good resolution in one sense, but the range of a small capacitive probe is small, and such small probes easily fall out of range.

It is an object of the invention to provide a sensor that can operate in a factory environment and provide a high frequency response, and accurate, reproducible measurements. Other objects of the invention will be apparent from the following description and claims.

SUMMARY OF THE INVENTION

A runout measuring device comprises a wheel for running against a moving object on which measurements are to be taken. The wheel is mounted on a movable support means whereby the support means moves in response to changes in dimensions of a moving object, and means are provided for measuring the amplitude of the movement of the support means. In the illustrated embodiment, the measuring device wheel has a diameter of ½ inch to 3½ inches and is set to run at substantially 0° with respect to the direction of motion a moving object. The wheel is preferably mounted on double sealed ball bearings.

In the illustrated embodiment, means for measuring the amplitude of movement comprises a magnetostrictive sensor and the wheel is attached to a partial cylinder. An end cross section of the partial cylinder comprises a "C" shape, and a "C" shaped magnet is attached to the partial cylinder at an end distal from the wheel, and a signal wire for activating the magnetostrictive sensor and making magnetostrictive measurements is inserted through the center of the "C" shaped magnet. The position of the "C" shaped magnet relative to the position of the wire in the active zone determines the magnitude of the magnetostrictive measurement.

Specifically, there is provided a runout measuring device comprising a base support arm, a non-contact sensing device mounted substantially at a first end of the base support arm, a short first support arm mounted substantially perpendicular to the base support arm substantially at a second end thereof, a second support arm mounted substantially perpendicular to the base support arm and substantially parallel to the first support arm. The second support arm has a slot for receiving a pivoting arm therethrough. The pivoting arm is connected to the first support arm at a pivoting end, the pivoting arm having a swinging end on which means are mounted for activating the sensor. The second support arm has a spring support arm mounted on an end distal from the base support arm substantially perpendicular to the second support arm, and a spring connecting the spring support arm and the pivoting arm, the spring tending to hold the pivoting arm at one end of the slot. The pivoting arm moves in response to changes in dimensions in an object to be measured and the movements are gauged by the sensing device.

The sensing device used in the apparatus is a magnetostrictive sensing device as described.

BRIEF DESCRIPTION OF THE DRAWINGS

FIG. 5 illustrates an alternative embodiment of an apparatus of the invention.

DETAILED DESCRIPTION OF THE INVENTION

Figure 1:
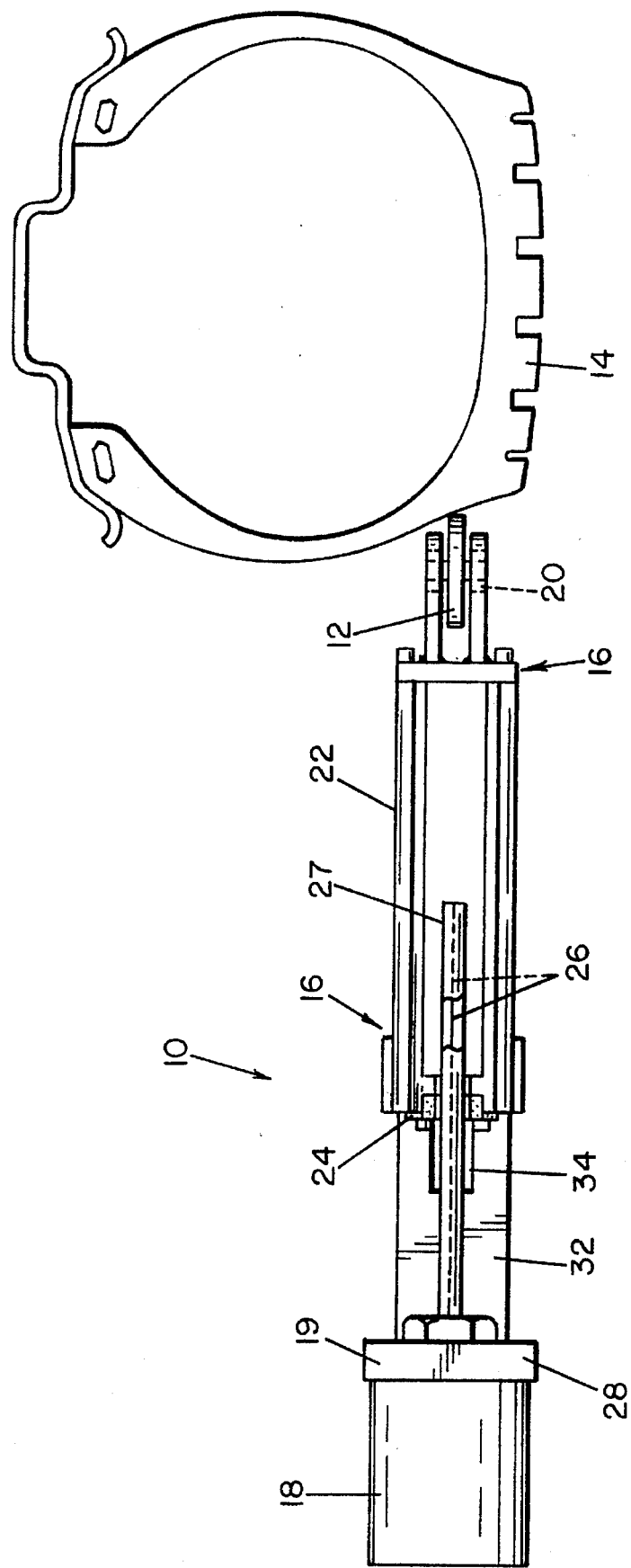
FIG. 1 illustrates an end view of the apparatus of the invention in proximity to a pneumatic tire.
Figure 2:
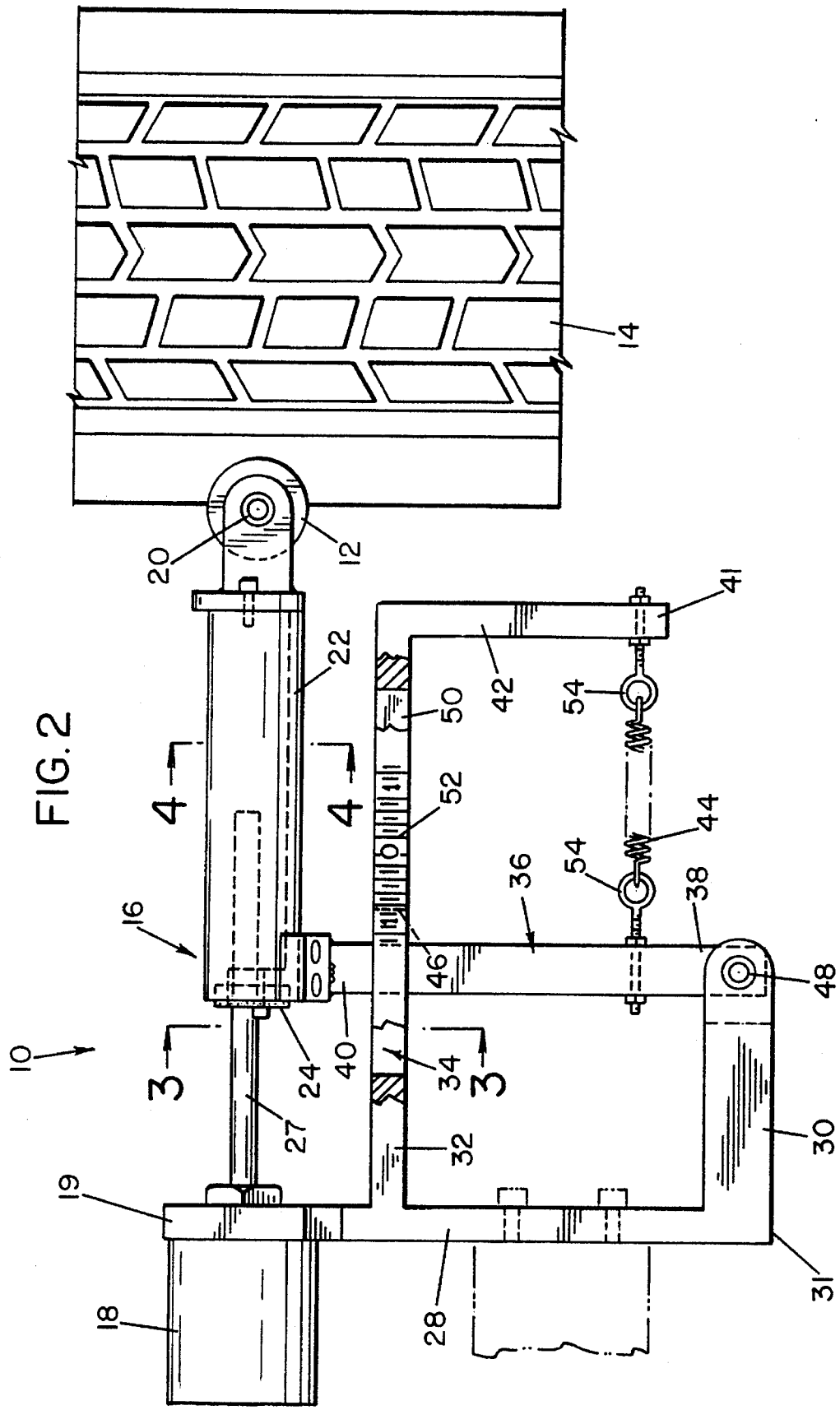
FIG. 2 illustrates a side view of the apparatus of the invention in proximity to a pneumatic tire.

With reference now to FIGS. 1 and 2, in an illustrated embodiment of a measuring device 10 of the invention, a wheel 12 makes contact with a moving object 14 which is to be measured. In the illustration, moving object 14 is a pneumatic tire. Wheel 12 can be made relatively large, and is preferably oriented at about 0°, relative to the direction of movement of the object being measured, to reduce the possibility of drag between the object being measured and the sensor. Although the apparatus will work for some purposes when contacting the object to be measured at an angle as illustrated, it is preferred that the wheel be normal to the surface of the object being measured.

Wheel 12 runs on double sealed ball bearings 20, for smooth turning and to prevent the turning of the wheel being affected by dust. As is apparent from the description below, even if some stiction takes place, the apparatus is set up such that the force of the stiction is perpendicular to the travel of the wheel 12, and stiction of the wheel does not have any effect on the measurement obtained.

Figure 3:
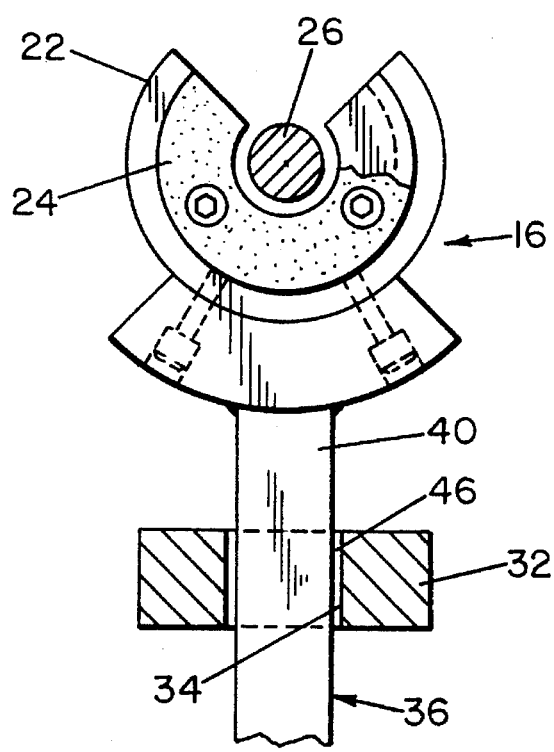
FIG. 3 illustrates a cut away end view, taken on line 3—3 of FIG. 2, of partial cylinder, "C" shaped magnet and signal wire used to produce a signal by the apparatus.
Figure 4:
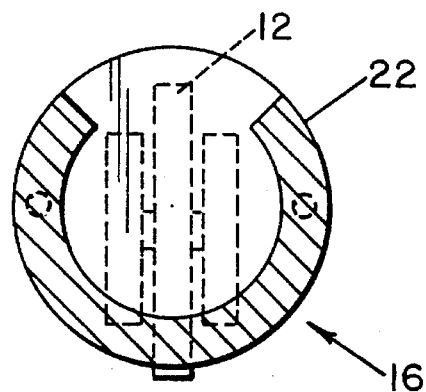
FIG. 4 illustrates an end view, taken on line of FIG. 2, of the partial cylinder viewed from the direction shown in FIG. 3.

Wheel 12 is mounted on movable support means 16 which, in the illustrated embodiment comprises a partial cylinder 22. By partial cylinder it is meant that a cross section of the cylinder comprises a "C" shape, i.e. the side of the cylinder is not completely closed (see FIGS. 3 and 4). The movement of partial cylinder 22 is instrumental in determining the magnitude of a signal which is sensed by sensing device 18 which is mounted on a first end 19 of base support arm 28.

Movable support means 16 is mounted on swinging end 40 of pivoting arm 36 such that pivoting arm 36 moves, and movable support means 16 moves, in response to changes in dimension of moving object 14 as it moves against wheel 12.

Pivoting arm 36 is connected to first support arm 30 of the apparatus at pivoting end 38, and pivoting arm 36 is forced to maintain contact between wheel 12 and moving object 14 by spring 44 which is attached to pivoting arm 36 and spring support arm 42 by hooks 54 mounted near pivoting end 38 of pivoting arm 36 and near first end 41 of spring support arm 42. Pivoting arm 36 moves on double sealed ball bearings 48.

The tension on spring 44 can be chosen to be compatible with the frequency response desired. A low spring rate spring is used when a low frequency response is desired, and a high spring rate spring can be used if a high frequency response is desired.

First support arm 30 is connected substantially at a second end 31 of base support arm 28. First support arm 30 and second support arm 32 are connected substantially perpendicular to base support arm 28, and substantially parallel to one another.

Second support arm 32 is connected to spring support arm 42 and base support arm 28, spring support arm 42 and base support arm 28 being substantially parallel to each other. Second support arm 32, connected substantially parallel to first support arm 30, has slot 34 for receiving pivoting arm 36 therethrough and for restricting the movement of pivoting arm 36. Slot 34 is large enough, however, to permit a range of motion for pivoting arm 36 to obtain the measurement required. When not in use, spring 44 tends to pull pivoting arm 36 to rest end 46 of slot 34. When an object to be measured 14 is mounted near measuring device 10, or when the measuring device is moved to an object 14, measuring device 10 is positioned so that pivoting arm 36 is well off rest end 46 of slot 34, so that a full range of motion, within the active range of the sensor, in both directions is possible.

In the illustrated embodiment, sensing device 18 is a magnetostrictive sensing device, and "C" shaped magnet 24 is mounted on the end of partial cylinder 22 distal from wheel 12. Signal wire 26, attached to magnetostrictive sensor 18, and encased in tube 27, is inserted into "C" shaped magnet 24. In such sensing devices, there is generally a specific active range within the wire that can be set by the manufacturer based on the specifications required by its use, and the relative position of "C" shaped magnet 24 on the length of the active range of the signal wire 26 determines the magnitude of a magnetostrictive reading obtained by measuring the time for a strain pulse which is induced by an electrical pulse that is sent through signal wire 26, the strain pulse being induced when the electrical pulse encounters the magnetic field of magnet 24, to return to sensing device 18. Thus, there is a direct correlation between the position of wheel 12 on an object 14 being measured and the magnitude of any readout that corresponds to the magnetostrictive measurement obtained.

In the illustrated embodiment, an MTS sensor, model number TTSRBU0020AS1U, having a two inch stroke and capable of registering 0 to 10 volts D.C. was used.

There are sensors available from MTS that use circular magnets, that operate on the same principle, that can also be used in the invention. The "C" shaped magnet is used in the present invention because it provides an increased range of motion because the wire is capable of passing outside the circle of the magnet through the open end of the "C".

In one sense, the sensor is a non contact sensor since the readings are dependent on the length of the active portion of signal wire 26 that passes through "C" shaped magnet 24, and these portions of the device are remote from, or out of contact with the object being measured.

The contacting wheel 12 can be made relatively large, in the order of ½ inch to 3½ inches in diameter, and the pivoting arm 36 can be made relatively long, in the order of 6 inches to 12 inches, so that the difference between the arc length of the travel of the magnet and the linear travel of the magnet within the range of the sensor is negligible. Alternatively, the wire can be bent to have an arc that matches the arc of travel of the magnet.

The only possible source of stiction in the direction of measurement of the apparatus would be stiction in double sealed ball bearing 48. The torque of a long pivot arm 36, however, minimizes this potential for error.

In the illustrated embodiment, second support arm 32 has a second slot 50, which reduces the weight of the apparatus. Scale 52 has no function in the use of the apparatus but was provided to aid the initial set up of the measuring device 10.

With reference now to FIG. 5, in an alternative embodiment of the apparatus of the invention, spring support arm 42 is turned so that spring 44 attaches near swinging end 40 of pivoting arm 36. The function of the apparatus is the same, and those skilled in the art will recognize that the tension on the spring will have to be adjusted because of the torque difference caused by its change in position. The alternative embodiment illustrates that those skilled in the art can modify the structure of the apparatus without changing its function.

The measuring device of the invention can be used to measure the gauge of calendered materials as they exit the calendar. The device can be used to measure the gauge of rigid materials such as steel, and the smoothness of such a measurement can be improved by adding rubber to the wheel. The measuring device of the invention can also be used with an apparatus for detecting ply defects in pneumatic tires as disclosed in U.S. Pat. No. 5,313,827. Other uses of the apparatus will be apparent to those skilled in the art.

The invention is further illustrated with reference to the following example.

EXAMPLE

This example compares results obtained using various types of sensors on the tire testing machine described in U.S. Pat. No. 5,313,827. In each run, two consecutive sets of measurements are taken by each sensor, and the difference between the individual data points in the two runs were tabulated, so the sensor could be checked for repeatability. In this example, three different types of sensors were tested.

2048 data points per rotation of a tire were obtained. The table below shows the results by indicating the number of data points that fall in various ranges of difference for each sensor.

TABLE I

| (Tire is rotating at approx. 7 RPM so acquisition rate is roughly 300 hertz) | | | | | |
| --- | --- | --- | --- | --- | --- |
| Sensor of Patent Application Run #1 | Sensor of Patent Application Run #2 | Contact-type Sensor** | Laser* Run #1 | Laser* Run #2 | Sensor of Patent Application Run #3 |
| Data points differ by less than 0.002" | | | | | |
| 2025 | 2010 | 1812 | 1607 | 1898 | 2038 |
| Differ by at least 0.002, less than 0.003" | | | | | |
| 23 | 38 | 28 | 351 | 144 | 10 |
| Differ by at least 0.003, less than 0.004" | | | | | |
| 0 | 0 | 38 | 79 | 6 | 0 |
| Differ by at least 0.004, less than 0.005" | | | | | |
| 0 | 0 | 30 | 11 | 0 | 0 |
| Differ by more than 0.005" | | | | | |
| 0 | 0 | 140 | 0 | 0 | 0 |

*Laser — Aromat mode #LA40HR
**Contact-type sensor with typical bushings in-line with direction of measurement (causes stiction)

All data points obtained by the sensor of the invention varied by less than 0.003 inch over two duplicate runs. The improvement over other types of sensors tested is apparent from the table.

While the invention has been specifically illustrated and described, those skilled in the art will recognize that the invention may be variously modified and practiced without departing from the spirit of the invention. The scope of the invention is limited only by the following claims.

What is claimed is:

1. A measuring device comprising a base support arm, a non-contact sensor mounted substantially at a first end of said base support arm, a short first support arm mounted substantially perpendicular to said base support arm substantially at a second end thereof, a second support arm mounted substantially perpendicular to said base support arm and substantially parallel to said first support arm wherein said second support arm has a slot for receiving therethrough a pivoting arm which is connected to said first support arm at a pivoting end, said pivoting arm having a swinging end on which means are mounted for activating said non-contact sensor, and wherein said second support arm has a spring support arm mounted on an end distal from said base support arm substantially perpendicular to said second support arm and a spring connecting said spring support arm and said pivoting arm said spring tending to hold said pivoting arm at one end of said slot, and wherein said pivoting arm moves in response to changes in dimensions in an object to be measured and said movements are gauged by said sensing device.

2. The measuring device of claim 1 in which the swinging end of said pivoting arm is attached to a partial cylinder whereby an end cross section of said partial cylinder comprises a "C" shape, a "C" shaped magnet being attached to said partial cylinder at an end thereof coincident with the attachment of said pivoting arm, and a signal wire attached to a magnetostrictive sensor is inserted through the center of said "C" shaped magnet for making magnetostrictive measurements whereby the length of active portion of the signal wire inserted through said "C" shaped magnet determines the magnitude of the magnetostrictive measurement.

3. The measuring device of claim 2 further comprising a wheel attached to said partial cylinder at an end distal from said "C" shaped magnet for running against a moving object on which measurements are to be taken, said wheel being movable in response to changes in dimensions of said moving object.

4. The measuring device of claim 3 in which said wheel is set to run at substantially 0° with respect to the direction of movement of said moving object.

5. The measuring device of claim 3 in which said wheel has a diameter of ½ inch to 3½ inches.

6. The measuring device of claim 3 in which said wheel and said pivoting arm are mounted on double sealed ball bearings.

* * * * *